United States Patent [19]
Grawley

[11] 3,857,617
[45] Dec. 31, 1974

[54] SPLIT CHEVRON TRACK SHOES FOR TRACK BELTS

[75] Inventor: Charles E. Grawey, Peoria, Ill.

[73] Assignee: Caterpillar Tractor Co., Peoria, Ill.

[22] Filed: Apr. 30, 1973

[21] Appl. No.: 355,477

[52] U.S. Cl. .............................................. 305/38
[51] Int. Cl. .......................................... B62d 55/08
[58] Field of Search .......... 305/35 R, 36, 37, 38, 19

[56] References Cited
UNITED STATES PATENTS

| | | | |
|---|---|---|---|
| 2,345,763 | 4/1944 | Mayne | 305/38 |
| 2,404,486 | 7/1946 | Hait | 305/38 |
| 2,933,351 | 4/1960 | Backhaus | 305/36 |
| 3,680,927 | 8/1972 | Neureuther | 305/35 R |

FOREIGN PATENTS OR APPLICATIONS

| | | | |
|---|---|---|---|
| 49,771 | 4/1939 | France | 305/38 |

*Primary Examiner*—Philip Goodman
*Attorney, Agent, or Firm*—Phillips, Moore, Weissenberger, Lempio & Strabala

[57] ABSTRACT

Flat faced track shoes attached to circular track belts employed around the periphery of pneumatic supporting carcasses can cause undesirable roughness and vibration in a vehicle equipped with such a system which can be substantially reduced by employing track shoes with a raised chevron or lug pattern disposed across at least two adjacent shoes, so that a portion of each chevron or lug pattern is split with the trailing or leading portions thereof located on adjacent track shoes, so the pattern smooths the transition between adjacent track shoes as they move into and through the footprint of the pneumatic supporting carcass. Because the individual shoes are articulated relative to one another the split chevron or lug pattern design tends to prevent dirt from packing between the chevron or lug patterns and improves the self-cleaning characteristics of the track belt. Further if the track shoes are formed of elastomer and have a slight interference fit obtained by an inverted truncated shape so they can be wedged together about the periphery of the belt, a fully sealed belt system is formed which prevents the ingress of dirt and debris between adjacent track shoes.

13 Claims, 8 Drawing Figures

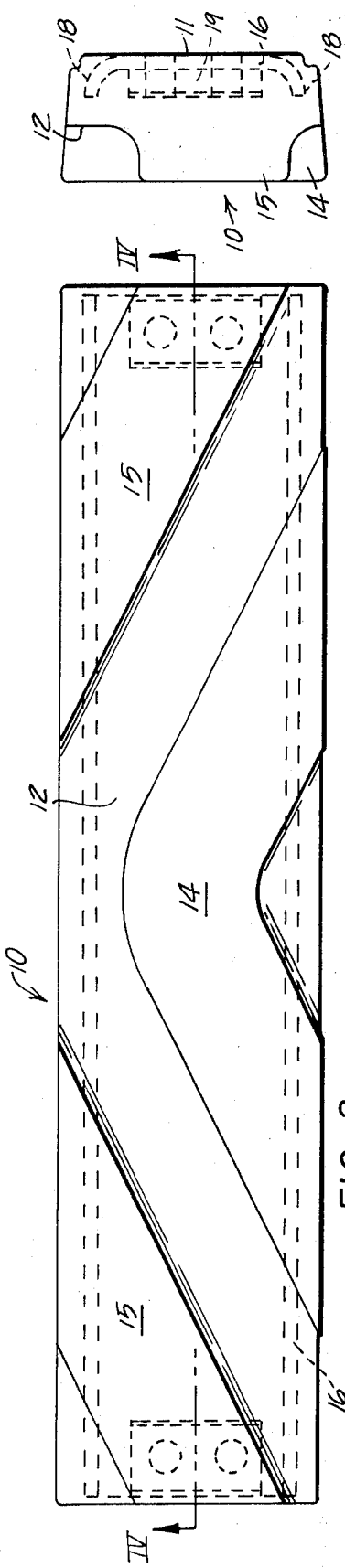
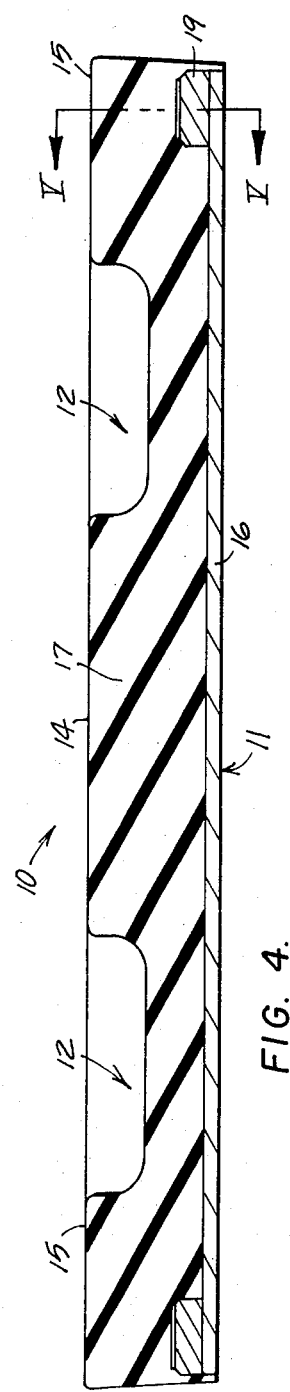
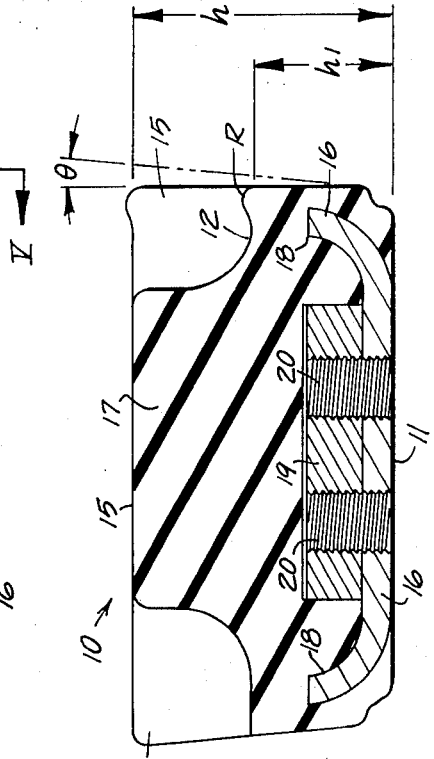

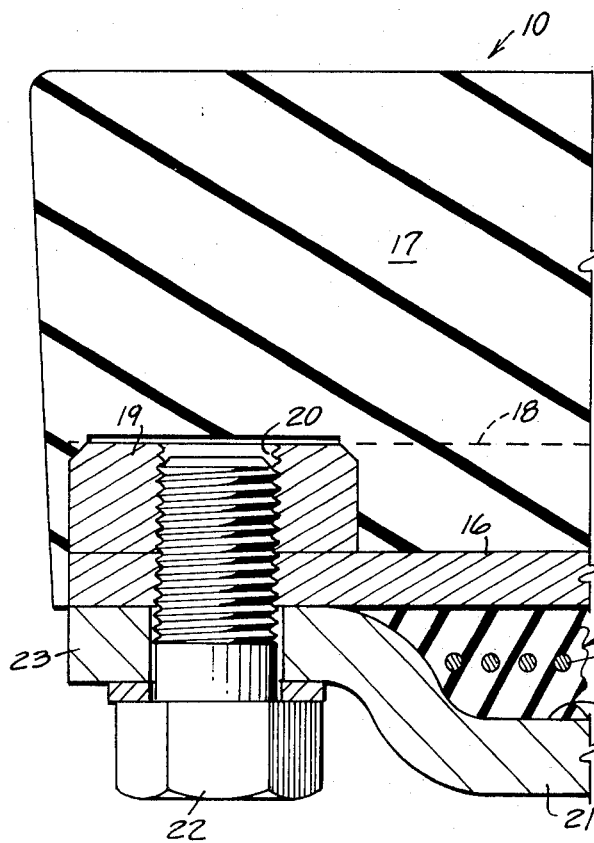
FIG. 8.
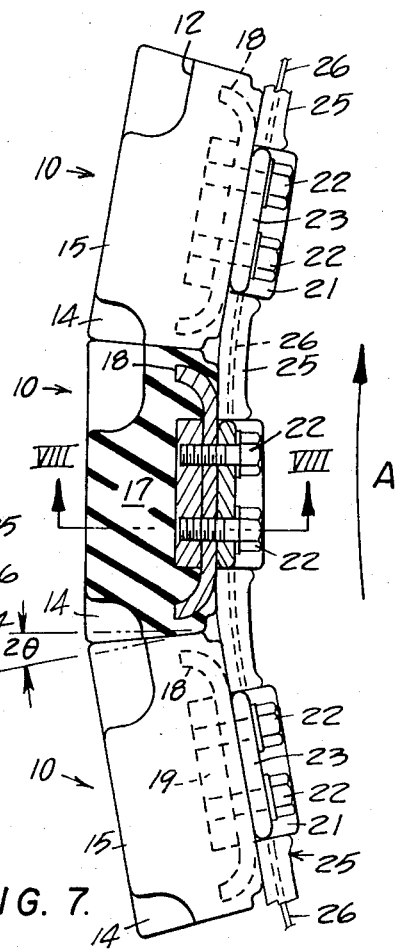
FIG. 7.
FIG. 6.
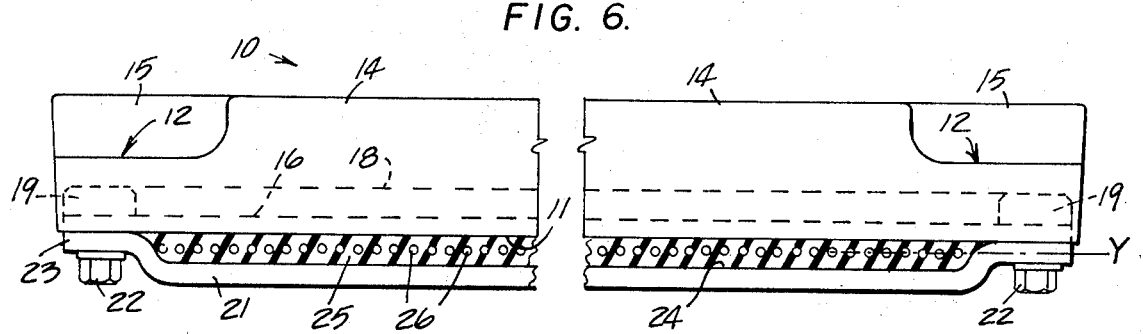

SPLIT CHEVRON TRACK SHOES FOR TRACK BELTS

BACKGROUND OF THE INVENTION

Track systems of various types have been mounted around the periphery of tire carcasses to improve floatation and to increase penetration resistance against foreign objects, as well as to enhance the tractive effort of the machine equipped with such a system. Generally these track systems, which are used on pneumatic supporting carcasses are one of the two types. They are either an articulated link chain type wherein the individual shoes are pivoted with one another, such as shown in U.S. Pat. No. 2,764,209 issued to Armington or the type which employs flexible reinforced belt structures on which the individual track shoes are attached, such as shown in U.S. Pat. No. 2,728,612 issued to Howe et al.

In particular the current invention is related to the flexible belt track systems wherein the track shoes are attached directly to a reinforced elastomer belt to form a track belt which is suitable for employment over a radial reinforced tube-tire carcass, such as shown in U.S. Pat. No. 3,606,921, issued to C. E. Grawey. Since this particular tube tire carcass provides a substantially flat crown and has an extreme oval cross section, it has excellent belt retention characteristics when inflated to its operating pressures.

In these flexible track belt systems, rectangular track shoes are usually attached to the reinforced elastomer belt by placing a rigid keeper on the inside of the belt (under the reinforcing) and bolting the track shoe or its attaching member, on the outside of the belt, to the keeper directly beneath the shoe to clamp a portion of the belt therebetween. This arrangement is disclosed in United States Patent Application Ser. No. 93,033, filed Nov. 27, 1970 by C. E. Grawey, entitled "Flexible Track Belts". The portions of the reinforced belt between adjacent track shoes (i.e., the unclamped portions of the belt) allow the individual track shoes to articulate relative to one another in an oscillatory manner which is not confined to an axis of a pivoted joint.

Because the individual rigid track shoes generally function as flats or flat surfaces, the resultant track system when mounted on a supporting pneumatic carcass looks much like a polygon, each shoe forming a segment thereof. As a result the transition from segment to segment (i.e., shoe to shoe) as the shoes move into and through the footprint, causes vibration which often increases in proportion to increased vehicle speed.

It is therefore a principal object of this invention to provide track shoes for flexible track belt systems which have lug or grouser patterns that smooth the transition from shoe to shoe as they pass into and through the footprint of the supporting pneumatic carcass.

Another object of the instant invention is the provision of track shoes for flexible track belts which have enhanced self-cleaning characteristics due to special lug or grouser pattern configurations on their working surfaces.

Still another object is the provision of shaped track shoes for flexible track belts which are formed of elastomer and which can be wedged about the peripheral surface of the flexible belt to seal the belt against the ingress of dirt and debris through the joint between contiguous track shoes.

Other objects and advantages will be apparent from the drawings and description herein.

SUMMARY OF THE INVENTION

An improved track shoe for flexible track belt systems having improved self-cleaning and vibration reducing characteristics includes a rectangular track shoe with an inner mounting surface and an outer working surface, a raised lug or grouser pattern on the working surface, with said raised pattern having a chevron configuration which includes the leading portion of one chevron pattern and the trailing portion of another chevron pattern, which portions are spaced on the working surface of each shoe so said portions cooperate with complementary chevron portions on adjacent track shoes when oriented in edgewise relationship to form a complete chevron lug or grouser pattern of split parts when the shoes are so mounted on a flexible reinforced belt.

BRIEF DESCRIPTION OF THE DRAWINGS

The description herein will be better understood by referring to the attached drawings wherein:

FIG. 2 is a plan of the track shoe shown in FIG. 1;

FIG. 3 is an end elevation of the track shoe shown in FIG. 1;

FIG. 4 is a longitudinal section of the track shoe along line IV—IV of FIG. 2;

FIG. 5 is a cross section along line V—V of FIG. 4;

FIG. 6 is an edge elevation of the track shoe mounted on a flexible track belt, the latter being shown in section;

FIG. 7 is an edge elevation of several track shoes mounted on a flexible reinforced belt having parts broken away, illustrating the end of one track shoe in section; and FIG. 8 is an enlarged sectional detail of one end of the track shoe and the flexible belt along line VIII—VIII of FIG. 7, illustrating the connection therebetween.

DESCRIPTION OF AN EMBODIMENT

Figure 1:
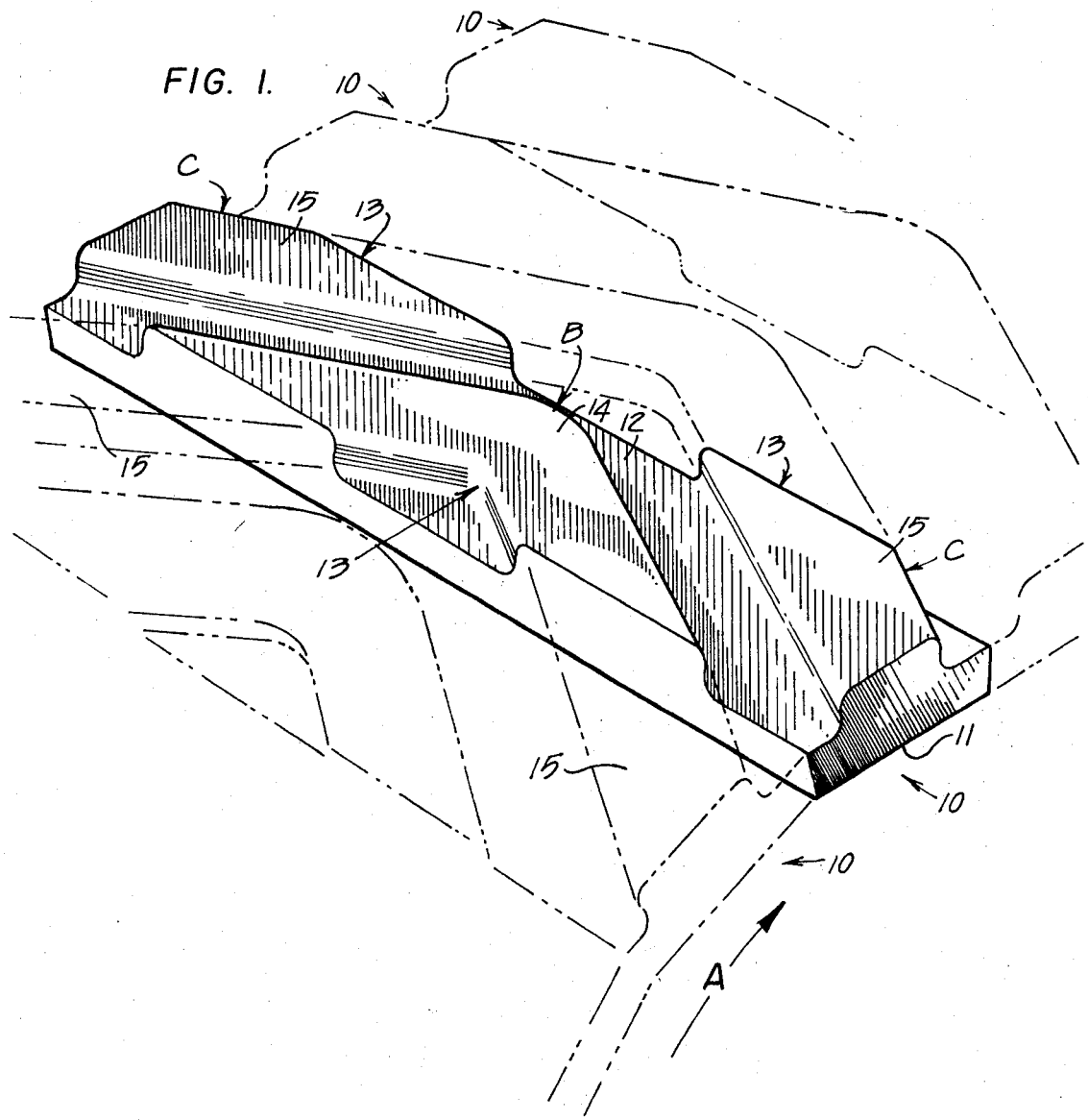
FIG. 1 is a perspective of an individual track shoe of this invention with adjacent track shoes shown in phantom so the complementary portions of the lug or grouser patterns on the several shoes can be seen.

In FIG. 1 the general lug or grouser configuration on the individual track shoe 10 is best shown. As can be seen, the shoe is generally rectangular having a belt mounting surface 11 and an outer working surface 12. Raised lugs or grouser patterns 13, (shown as chevron shaped), extend from the working surface. However, in place of putting one complete chevron lug or grouser pattern on the working surface of an individual shoe, this invention splits each chevron pattern by placing parts or portions thereof on at least two adjacent shoes.

Since the direction of the track belt travel is usually in the direction of the apex of the chevron lug or grouser pattern which is oriented transversely of the belt, as indicated by arrow A in FIG. 1, the apex portion B of the raised lug or grouser pattern can be referred to as the leading portion and the extending ends C of the chevron pattern can be referred to as the trailing portions 15.

With each track shoe 10 having both a leading portion 14 and separate trailing portions 15 formed on their working surface 12, these raised pattern portions can be oriented to cooperate with complementary chevron pattern portions on adjacent or contiguous edgewise oriented track shoes, as illustrated in FIG. 1, thus forming a split chevron lug or grouser pattern about the periphery of the flexible track belt.

Because of the split chevron lug or grouser pattern, the transition from shoe to shoe as they move into and through the foot print is somewhat smoother than other types of patterns and the articulation between the several portions of each chevron lug or grouser pattern enhances self-cleaning characteristics. It can be appreciated that the track shoe and the raised lug or grouser patterns thereon could be formed of metal, or alternatively, formed mostly of elastomer, the latter being the more preferred.

The elastomer embodiment is preferred because the resiliency of the rubber reduces the vibrations still further and the configuration of the rubber shoe can also be adjusted to seal dirt and debris from between the joints of adjacent track shoes providing another advantage to the particular design. In view thereof, and other advantages that can be obtained by the elastomer embodiment, the remainder of the description will be limited to the more preferred elastomer embodiment of the track shoe.

FIGS. 2 through 5 illustrate the elastomer embodiment of the track shoe 10 having the split chevron lug or grouser pattern discussed above. In this construction a metal mounting bar 16 is used in the base of the track shoe forming part of mounting surface 11, with elastomers 17 molded and vulcanized to the mounting bar to form the remainder of the rubber or elastomer track shoe. Since elastomers are easily molded, the lug or grouser pattern can be formed on the outer working surface 12 of the shoe, as described, and obviously the formulation of the various elastomers can be selected to improve their wear characteristics for this particular application. Two longitudinal edges 18 of each mounting bar are rolled about a small radius to give the mounting bar a channel-like shape, as is best illustrated in FIGS. 3, 5 and 7, thereby enhancing its rigidity and increasing the bonding surface area between the bar and the elastomers, or the elastomeric materials as the case may be.

Adjacent to each end of the mounting bar 16, a small threaded plate 19 is attached between the rolled edges 18 which includes threaded bores 20 that extend through the mounting plate by which the track shoes can be attached to a keeper bar 21 (see FIGS. 6, 7 and 8) with tap bolts 22 which are received in these bores to connect keeper bar to the track shoe 10.

As can be seen in FIGS. 6 through 8, the tap bolts 22 pass through holes in the ends 23 of the keeper bar 21 which are offset from the main portion of the keeper bar to form a trough 24 that receives the rectangular flexible track belt 25. This trough is sized so the flexible belt is slightly oversized in order to achieve a tightly clamped portion of the belt between the keeper bar and mounting surface 11 formed by the mounting bar 16 as the tap bolts draw these several bars together.

The flexible belt 25 is formed to the configuration of the trough so that minimum extrusion of the elastomer between the keeper and surface 11 will occur when the belt is clamped between these members. Inextensible reinforcing filaments 26 are oriented centrally in the flexible belt 25 to form one or more cylindrical plies of reinforcing encased by elastomers. This belt can be made on a suitable drum by forming an uncured elastomer cylinder thereon and then helically winding the elastomer cylinder with reinforcing filaments 26 in a side-by-side relationship (not shown) whereby each cylindrical ply of reinforcing is formed thereon and is made up of a plurality of convolutions of the filaments. A second uncured elastomer cylinder then can be formed on the reinforcing ply after which the belt is cured with heat and pressure in an autoclave. If desired the keeper bars 21 can be integrally formed with the belt by locating these bars in proper spaced relationship about the drum before the first uncured elastomer cylinder is formed thereon. The belt then can be built on the cylinder of elastomers over the bars and subsequently cured as a unit with the keeper bars whereby the latter are bonded to the belt for improved coupling action. It should be noted that the cylindrical plies are located so that they will be at or near the neutral transverse bending axis Y of the belt, limiting the stresses on the reinforcing filaments forming the cylindrical ply as the several shoes articulate relative to one another. The reinforcing filaments can conveniently be selected from brass plated steel wires or cables or other filaments having comparable characteristics.

Using locators in a belt building drum described above, the keeper bars 21 may be accurately located and uniformly spaced about the inside of the flexible belt when they are bonded as an integral unit. In this situation, the elastomer embodiment of the track shoe 10 can be shaped to provide a sealed belt by a slight interference fit between the contiguous edges of adjacent track shoes. To achieve this interference fit the track shoes are formed with a truncated wedge-shaped cross section that is best illustrated in FIGS. 5 and 7. In particular, referring to FIG. 5 it can be seen that while the elastomer track shoe has a height $h$, including the height of the lug or grouser pattern thereon, the height $h_1$ of the main portion of the elastomer track shoe is only about one-half the total height. As a result the required deflection of the elastomer through a small angle $\theta$ as shown in FIG. 5 will be mostly absorbed in the distortion of the lug or grouser patterns at the outer surface of the track shoe while a small ridge R will develop on the working surface 12 of contiguous shoes to accommodate the change from a circular belt configuration to a generally flat belt configuration as the shoes pass through the footprint. Thus little wear will occur due to the pinching out of the portions of the lug or grouser patterns as the shoes pass through the footprint, even though they are constructed with the wedge shape and have been designed for slight interference fit to seal out dirt from the joint between the elastomer track shoe. With the keeper bars molded integrally with the belt the shoes are accurately located on the outer circumference of the belt to achieve a uniform interference fit about the outer periphery thereof. FIG. 7 shows the normal curved configuration of the flexible belt with the truncated wedge shaped elastomer track shoes which will distort (as shown for one edge in FIG. 5) at both edges, as they pass into and through the footprint.

In the elastomer embodiment of the track shoes, a preferred one, the shape factor is important, as a higher shape factor reduces deflection when the track shoe is compressively loaded when passing through a foot print of a supporting carcass. As the deflection is decreased, heat build-up and deterioration will be reduced, leading to longer wear characteristics. A discussion of shape factor can be found in "Handbook of Molded And Extruded Rubber," 2nd Edition, published by the Goodyear Tire & Rubber Company, Akron, Ohio.

As shape factor is empirically defined as the ratio of the area of one load face to the area of those surfaces free to expand laterally when considering elastomer with parallel loading faces, confinement of the opposite edges of the base of the track shoe enhances the shape factor. In FIG. 5, the elastomer base of the track shoe 10 has a height of $h_1$ in reference to the total height $h$ of the track shoe, and it can be seen the track shoe has a wedge shape when viewed from one end so a slight interference along their opposite edges occurs with contiguous shoes when they are assembled on a track belt. As a result, these edges are constrained, leaving only the ends of the track shoes available for lateral expansion of the elastomer therein. Because the shoes tend to move into a flat aligned plane in the footprint, these edges are also subjected to some compressive loading at the same time the top surface track shoe is being subjected to compressive loadings. Thus, in the base of the track shoe the shape factor can be about 10.0 or higher. The total shape factor of the track shoe will depend on the configuration of the lug or grouser pattern and the ability of the lug and grouser configuration to limit the areas available for lateral expansion of elastomers, as a compressive force is applied to the top of the shoe. Of course, the lower heights for the lug or grouser pattern will improve the overall shape factor. In general, it is preferred the lug or grouser pattern be less than the height $h_1$ of the base of the elastomer shoe and that the overall shape factor be at least 0.30. (See FIG. 5). As the base portion is integral with the lug or grouser patterns, its cooler operation will help dissipate the heat build-up in the lug or grouser portion, which has greater proportional deflection because of less confinement against lateral expansion.

In the preceding specification and following claims reference is made to a channel-shaped mounting bar, however, it should be understood that channel-shaped refers to a mounting bar which may have a T-shaped cross-section, the U-shaped cross-section shown in the drawings for purposes of illustration, of other cross-sectional configurations providing similar or higher stiffening moduli and bonding surface areas.

Having described my invention I claim:

1. In combination with a flat circular belt reinforced with at least one cylindrical ply of inextensible reinforcing centrally disposed therein and encased in elastomer which forms the surfaces of said belt, a plurality of track shoes, each comprising:
   a rectangular track shoe composed of elastomer having an inner mounting surface and an outer working surface, said inner mounting surface including a metal channel-shaped mounting means which is bonded to said track shoe and which forms part of the inner mounting surface of each track shoe;
   a raised grouser pattern on the working surface of said rectangular track shoe; and
   attaching means associated with the ends of each of said channel-shaped means operable to connect said track shoe to said belt.

2. The combination defined in claim 1 wherein the raised grouser pattern on each of said track shoes is chevron-shaped.

3. The combination defined in claim 2 wherein the chevron-shaped grouser pattern includes a leading portion of one chevron-shaped pattern and a trailing portion of another chevron-shaped grouser pattern spaced on the working surface, said portions oriented on said working surface so they cooperate with complementary portions on an adjacent track shoe to form at least one complete chevron-shaped grouser pattern when assembled in adjacent edgewise relationship on the flat circular belt.

4. The combination as defined in claim 1 wherein the attaching means includes keeper means which extend transversely of the cylindrical ply inside said circular flat belt, said keeper means having connecting means to attach said keeper means to each of said track shoes.

5. The combination as defined in claim 4 wherein the keeper bars are integrally formed in said track belt inside of the cylindrical ply and are equally spaced about the inner circumference of the circular flat belt.

6. The combination as defined in claim 5 wherein the cross section of each track shoe is a truncated inverted wedge shape extending from the inner mounting means and said track shoes are wedged together when attached to the circular flat belt in a manner which prevents the ingress of debris between the joint of contiguous track shoes.

7. The combination defined in claim 6 wherein the track shoes wedged together on the flat circular belt have a shape factor of at least 0.30.

8. The combination defined in claim 6 wherein the flat circular belt forms part of a tire carcass and the keeper bars couple said track shoes to said tire carcass.

9. An improved track shoe for flexible track belt systems comprising:
   a rectangular elastomer track shoe with an inner mounting surface and an outer working surface; said inner mounting surface including an elongated channel-shaped mounting means for anchoring said elastomer track shoe to a flexible track belt with a bar-like portion of elastomer bonded to said channel-shaped mounting means forming the body of said elastomer track shoe, said bar-like portion sized so its sides parallel to said channel-shaped mounting means will be contiguous to the sides of the bar-like portions of adjacent track shoes to enhance the shape factor of said several shoes when they are attached to said flexible track belt; and
   a riased elastomer grouser pattern formed on said working surface, said grouser pattern formed integrally with said bar-like portion.

10. The track shoe defined in claim 9 wherein the sides of its bar-like portion diverge from the channel-shaped mounting means so a slight interference between the contiguous sides will be obtained when several track shoes are mounted on the flexible track belt.

11. The track shoe defined in claim 9 wherein the bar-like portion of the track shoe has a shape factor of at least 0.30 when assembled in contiguous relationship on the track belt.

12. The improved track shoe as defined in claim 9 the grouser configuration including a leading portion of one pattern and a trailing portion of another pattern spaced from one another on said working surface, said portions oriented on said working surface so they cooperate with complementary portions on adjacent track shoes to form a complete grouser pattern when said track shoes are assembled in an edge abutting relationship on a flexible track belt.

13. The improved track shoe defined in claim 9 in combination with a flexible belt having a plurality of keeper means spaced about its inner periphery for attaching said track shoes and at least one ply of inextensible reinforcing centrally disposed therein and surrounded by elastomer with said keeper means located about the inner periphery of said flexible belt, so said track shoes can be attached to the outer periphery thereof.

* * * * *